United States Patent [19]
Kropp

[11] Patent Number: 5,852,774
[45] Date of Patent: Dec. 22, 1998

[54] SIDETONE LEVEL REDUCTION CIRCUIT AND METHOD

[75] Inventor: Stephen George Kropp, Surrey, Canada

[73] Assignee: VTech Communications, Ltd., Tai Po, Hong Kong

[21] Appl. No.: 706,826

[22] Filed: Sep. 3, 1996

[51] Int. Cl.[6] .............................. H04B 1/10; H04B 1/62
[52] U.S. Cl. ........................ 455/403; 455/553; 455/570; 455/307
[58] Field of Search .............................. 455/403, 73, 553, 455/570, 303, 307; 375/244, 247, 248, 249, 250, 251, 252; 370/407, 474; 379/402, 406, 407, 410, 390, 144

[56] References Cited

U.S. PATENT DOCUMENTS

| | | | |
|---|---|---|---|
| 4,450,554 | 5/1984 | Steensma et al. | 370/407 |
| 4,646,322 | 2/1987 | Flanagin et al. | 375/247 |
| 4,677,656 | 6/1987 | Burke et al. | 455/403 |
| 5,315,645 | 5/1994 | Matheny | 379/144 |
| 5,381,475 | 1/1995 | Cavallo | 455/570 |
| 5,553,137 | 9/1996 | Nyhart et al. | 455/570 |

*Primary Examiner*—Willis R. Wolfe
*Attorney, Agent, or Firm*—Dick and Harris

[57] ABSTRACT

A sidetone level reduction circuit for reducing the sidetone level in digital cordless telephones incorporating continuously variable slope delta modulator/demodulator (CVSD) digital to analog technology is disclosed comprising a CVSD encoder for converting an analog voice signal to a digital signal, a CVSD decoder for converting a digital signal to an analog signal voice signal, and coupling means connecting the coincidence output of the CVSD encoder and the coincidence output of the CVSD decoder in a manner such that the coincidence output of the CVSD decoder can affect the CVSD encoder but the CVSD encoder cannot affect the CVSD decoder.

3 Claims, 2 Drawing Sheets

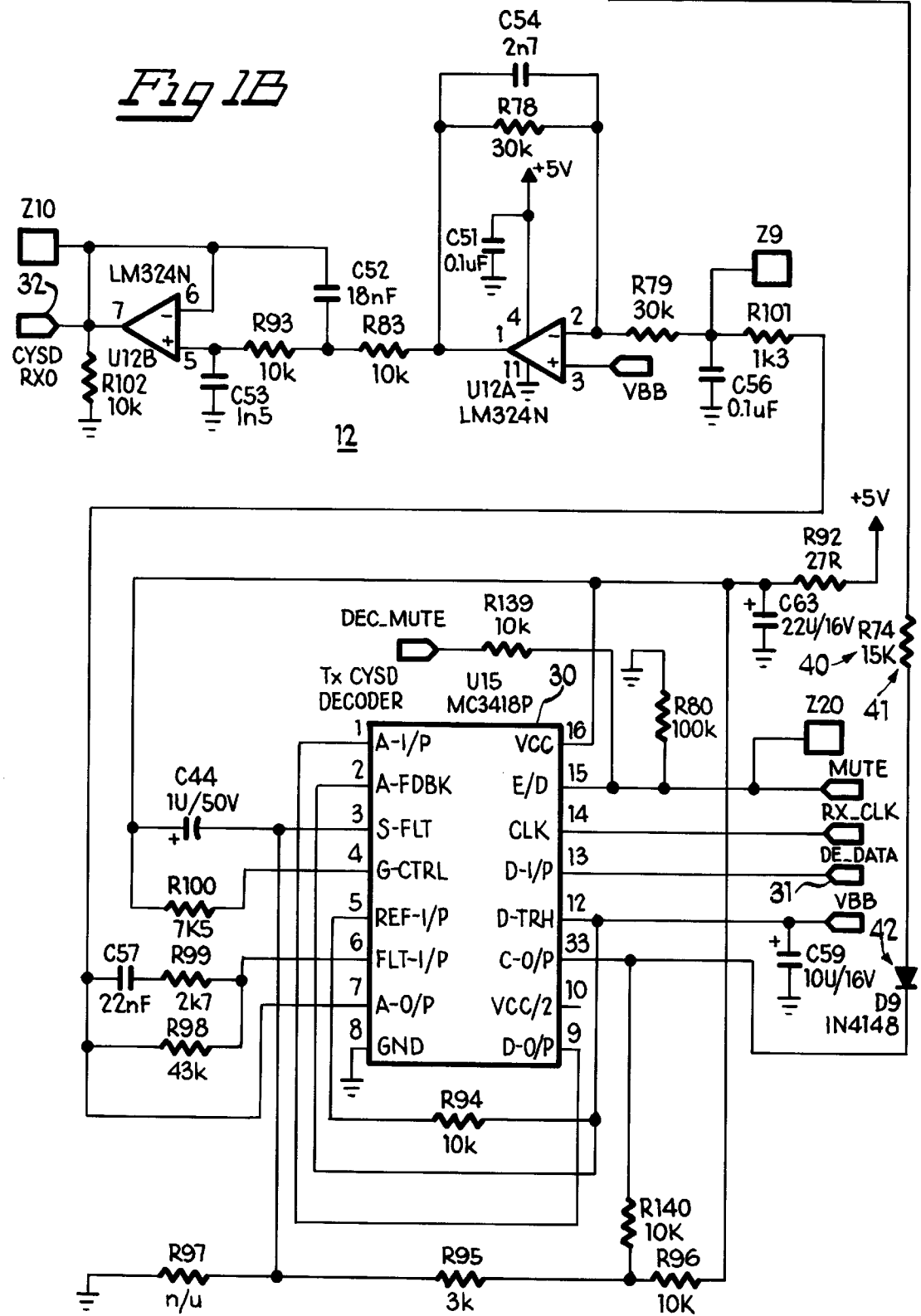

SIDETONE LEVEL REDUCTION CIRCUIT AND METHOD

BACKGROUND OF THE INVENTION DISCLOSURE

1. Field of the Invention Disclosure

The present invention is directed to cordless telephone communication devices and in particular to a device and method for reducing sidetone levels in digital cordless telephones incorporating continuously variable slope delta modulator/demodulator (CVSD) digital to analog technology.

2. Background of the Invention Disclosure

Cordless telephones have been known in the art for several years. Conventional cordless telephone devices utilize a stationary baseset unit and a portable handset unit. The baseset unit is physically and electrically connected to both a source of electrical power and to the telephone company central office. The portable handset unit is wireless and in general communicates with the baseset unit via a radio frequency link to in turn communicate with an outside party connected to the telephone company hardwire system.

When the cordless telephone user is engaged in a telephone call with an outside party the user's voice is picked up by a microphone in the handset unit and transmitted to the baseset unit, in either an analog or digital format, via the radio frequency link. Once received by the baseset unit the electrical signal containing the user's voice is decoded and routed to the telephone company hardwire network. The cordless telephone user hears the other party to the call by listening to a speaker contained in the handset unit. The outside party's voice is received from the telephone company in the conventional format and is converted by the baseset unit to the format suitable for transmission to the handset unit.

In digital prior art cordless telephone systems, the user's voice is picked up by the handset unit microphone, converted into a digital signal and transmitted to the baseset unit. In the baseset unit, the received digital signal is converted to an analog signal and then combined with the outside party's voice by a conventional 2 to 4 wire hybrid circuit and then connected to the telephone company central office. The outside party's voice and a portion of the user's voice are both converted into a digital signal by the baseset unit. The digital signal is then transmitted back to the handset unit where it is converted from a digital signal to an analog signal such that both voices are audible to the user via the handset unit speaker.

In an ideal 2 to 4 wire hybrid circuit there would be complete isolation between the user's voice and the outside party's voice on the 4 wire side of the 2 to 4 wire hybrid circuit and only the outside party's voice would be transmitted to the handset unit speaker. In an actual implementation of a 2 to 4 wire hybrid a portion of the user's voice is present in the audio path to be transmitted to the handset unit speaker. The sound of the user's own voice as heard through the handset unit speaker is termed "sidetone". A reasonable level of sidetone allows the user the hear his or her own voice and know how loudly to speak so as not to overpower the other party to a call, although, an excessive level of sidetone is undesirable. Sidetone level is typically defined as a ratio of the volume of the user's voice present at the handset speaker to the volume of the user's voice present at the handset microphone, and is expressed in decibels.

The sidetone produced by existing digital cordless telephone products that use CVSD technology have two main criticisms. First, while the sidetone level is in practice somewhat reduced by the operation of the conventional 2 to 4 wire hybrid, the sidetone is nevertheless typically deemed too loud. Second, a "reverb" effect is caused by the 0.5 mS delay which is typically experienced as the handset user's voice is converted to a digital signal, transmitted to the baseset unit, converted back into an analog signal, combined with the outside party's voice, converted to a digital signal, transmitted back to the handset unit, converted back to an analog signal, and then finally heard in the handset unit speaker.

Accordingly, one of the objects of the present invention is to reduce the level of sidetone and the reverb effect experienced by the user of a digital cordless telephone.

This and other objects of the invention will become apparent in light of the present specification, drawing and claims.

SUMMARY OF THE INVENTION

A sidetone level reduction circuit is disclosed for reducing the sidetone level in digital cordless telephones incorporating continuously variable slope delta modulator/demodulator (CVSD) digital to analog technology. A CVSD encoder is provided for converting an analog signal to a digital signal for transmission from the baseset unit to the handset unit wherein the CVSD encoder has a coincidence output. A CVSD decoder is provided for converting a digital signal received from the handset unit to an analog signal voice signal wherein the CVSD decoder has a coincidence output. A resistor and diode are connected in series between the coincidence output of the CVSD encoder and the coincidence output of the CVSD decoder in a manner such that the coincidence output of the CVSD decoder can affect the CVSD encoder but the CVSD encoder cannot affect the CVSD decoder.

A method is disclosed for reducing sidetone level in digital cordless telephones incorporating a continuously variable slope delta (CVSD) encoder, having a coincidence output, for converting an analog signal to a digital signal for transmission from the baseset unit to the handset unit, and a CVSD decoder, having a coincidence output, for converting a digital signal received from the handset unit to an analog signal voice signal. The method comprises coupling the coincidence output of the CVSD encoder and the coincidence output of the CVSD decoder in a manner such that the coincidence output of the CVSD decoder can affect the CVSD encoder but the CVSD encoder cannot affect the CVSD decoder.

DETAILED DESCRIPTION OF THE DRAWINGS

Figures 1, 1A:
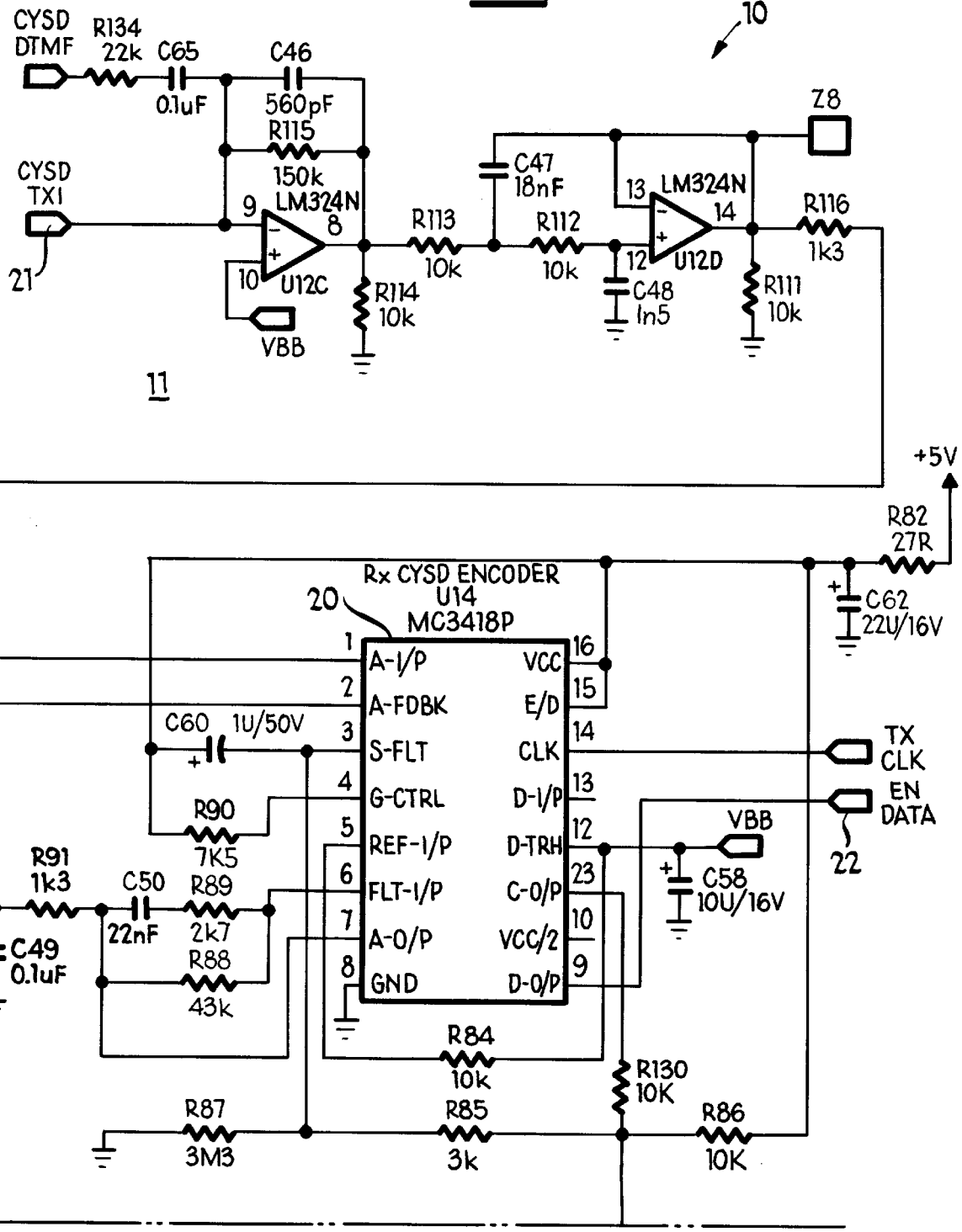
FIG. 1 of the drawings is a schematic diagram of a portion of the baseset unit circuitry specifically illustrating the interconnection of the baseset unit's CVSDs and sidetone level reduction circuit.

While this invention is susceptible of embodiment in many different forms, there is shown in the drawings and will herein be described in detail, one specific embodiment, with the understanding that the present disclosure be considered as an exemplification of the principles of the invention and is not intended to limit the invention to the embodiment illustrated.

FIG. 1 is a schematic diagram of a portion of the baseset unit circuitry which discloses the pertinent part of a digital cordless phone as it relates to the present invention. In part, the interconnection between the baseset receiver CVSD encoder 20 and the baseset transmitter CVSD decoder 30. In the design of the illustrated digital cordless telephone device, continuously variable slope delta modulator/ demodulator (CVSD) modules are utilized to provide a simplified approach to digital speech encoding and decoding. CVSD modules, such as the MC3418 by Motorola incorporated into the present design, compare the incoming analog audio signal with the analog audio signal that has been reconstructed from its digital representation. A coincidence output of the CVSD module adjusts the slope of the reconstructed audio signal to match the incoming audio signal. Since sidetone requires the same handset unit user's audio signal to be present in the transmit and receive audio paths, the slope of this portion of the audio signal in the baseset unit transmitter CVSD decoder 30 and receiver CVSD encoder 20 are similar.

Circuit portion 11 illustrates the delta modulator portion of the baseset unit circuitry which serves to encode the analog voice signal for transmission as a digital voice signal to the handset unit. The input to baseset transmitter CVSD encoder 20 is the analog voice signal 21 originating with the telephone company central office which is digitized by encoder 20 resulting in signal 22 for transmission to the cordless telephone handset such that the cordless telephone user may hear both his and the outside party's voices through the handset unit speaker. Circuit portion 12 illustrates the delta modulator portion of the baseset circuitry which serves to decode the digital voice signal received from the handset unit providing the analog voice signal to the telephone company central office. The input to baseset receiver CVSD decoder 30 is a digital voice signal 31 which is converted to an analog voice signal for connection to the telephone company central office such that the cordless telephone user's voice may be heard by the outside party.

Sidetone level reduction circuitry 40 is illustrated as comprising the electrical connection of output pin 11 (23) of baseset receiver CVSD encoder 20 to output pin 11 (33) of baseset transmitter CVSD decoder 30, via resistor 41 and diode 42 connected in series. In operation, the output pin 11 (33) of CVSD decoder 30, an active low signal, serves to alter the slope of baseset receiver CVSD encoder 20. Specifically, when the output pin 11 (33) of CVSD decoder 30 goes low, the slope of baseset receiver CVSD encoder 20 is lowered. Output pin 11 (33) of baseset transmitter CVSD decoder 30 is active when it is detected that the user is speaking into the handset unit microphone. Accordingly, when the user is speaking, the slope of baseset receive CVSD encoder 20 is lowered such that the "volume" of the voice signals heard through the handset unit speaker is lowered thereby reducing the sidetone level of the handset unit. Diode 42 insures that baseset transmitter CVSD decoder 30 can affect the operation of baseset receiver CVSD encoder 20 and that baseset receiver CVSD encoder 20 cannot alter the operation of baseset transmitter CVSD decoder 30.

Accordingly, the baseset transmitter CVSD decoder coincidence output aids the reconstructed audio in the baseset receiver CVSD encoder to closely follow the incoming audio signal without having to assert its coincidence output. As a result, the digital data stream that arrives at the receiver CVSD decoder in the handset unit (not shown) does not assert the coincidence output and therefore the audio signal reconstructed in the handset unit has less slope and amplitude than the original signal. The received audio is attenuated only when speech is present at the handset microphone since the coincidence output is inactive when there is low or no audio signal present at the handset microphone.

The foregoing description and drawing merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A sidetone level reduction circuit for reducing the sidetone level in digital cordless telephones incorporating continuously variable slope delta modulator/demodulator (CVSD) digital to analog technology, said sidetone level reduction circuit comprising:

a CVSD encoder for converting an analog signal to a digital signal for transmission from the baseset unit to the handset unit, the CVSD encoder having a coincidence output;

a CVSD decoder for converting a digital signal received from the handset unit to an analog signal voice signal, the CVSD decoder having a coincidence output; and coupling means connected in series between the coincidence output of the CVSD encoder and the coincidence output of the CVSD decoder in a manner such that the coincidence output of the CVSD decoder can affect the CVSD encoder but the CVSD encoder cannot affect the CVSD decoder.

2. The invention according to claim 1 wherein the coupling means comprises a resistor and a diode connected in series.

3. A method for reducing sidetone level in digital cordless telephones incorporating continuously variable slope delta modulator/demodulator (CVSD) digital to analog technology, said sidetone level reduction method comprising:

supplying a CVSD encoder for converting an analog signal to a digital signal for transmission from the baseset unit to the handset unit, the CVSD encoder having a coincidence output;

supplying a CVSD decoder for converting a digital signal received from the handset unit to an analog signal voice signal, the CVSD decoder having a coincidence output; and coupling the coincidence output of the CVSD encoder and the coincidence output of the CVSD decoder in a manner such that the coincidence output of the CVSD decoder can affect the CVSD encoder but the CVSD encoder cannot affect the CVSD decoder.

* * * * *